United States Patent

Ostrognai

[15] 3,638,470
[45] Feb. 1, 1972

[54] METHOD OF MAKING A FAN

[72] Inventor: Allen Gilbert Ostrognai, Fort Wayne, Ind.

[73] Assignee: General Electric Company

[22] Filed: June 6, 1969

[21] Appl. No.: 831,072

[52] U.S. Cl. .............................. 72/324, 72/379, 29/156.8 B
[51] Int. Cl. ................. B21d 43/28, B21c 37/02, B21k 3/04
[58] Field of Search ............. 72/324, 379; 10/86, 86 A, 86 B; 287/52.08; 29/156.8

[56] References Cited

UNITED STATES PATENTS

| 138,994 | 5/1873 | Chase | 29/156.8 |
|---|---|---|---|
| 3,006,231 | 10/1961 | Kahn | 10/86 |
| 3,072,424 | 1/1963 | Mayne | 287/52.08 X |
| 2,240,597 | 5/1941 | Whitefield | 29/156.8 |
| 2,628,017 | 2/1953 | Zaino | 29/156.8 |
| 832,386 | 10/1906 | Hughes | 287/52.08 X |

Primary Examiner—Charles W. Lanham
Assistant Examiner—R. M. Rogers
Attorney—Allard A. Braddock, John M. Stoudt, Frank L. Neuhauser, Oscar B. Waddell, Ralph E. Krisher and Joseph B. Forman

[57] ABSTRACT

A setscrew aperture is produced on the surface of a sheet metal workpiece by deforming a portion of the workpiece surface, as by lancing and crimping or by bending a pair of spaced, aligned punched tabs, to define a setscrew passageway which may be threaded coincidentally with the deforming step or in a later step.

3 Claims, 4 Drawing Figures

PATENTED FEB 1 1972

INVENTOR
ALLEN G. OSTROGNAI
BY
Allard A. Braddock
ATTORNEY

METHOD OF MAKING A FAN

BACKGROUND OF THE INVENTION

Rotatable members such as fans which are mounted on shafts are normally fastened to the shafts either by a press fit assembly or by the use of setscrews. The press fit is normally reserved for those applications where there is little likelihood that the rotating member will have to be removed from the shaft after it has once been secured thereto. When setscrews are used the setscrew apertures are positioned in rather massive material, such as castings, by drilling and tapping. Where the rotatable member is made of sheet metal it is arranged to fit on a hub in which the setscrew aperture is drilled. This provides the strength necessary to enable the setscrew to be tightened sufficiently to prevent rotation of the rotatable member on the shaft. The massive construction of the member containing the setscrew aperture is costly to fabricate and, in many instances, adds also to the cost of assembling.

DESCRIPTION OF THE INVENTION

The present invention is aimed at enabling a sheet metal rotatable member to be mounted directly upon a shaft instead of a hub containing a setscrew. This is achieved by deforming a portion of the material of the rotatable member itself in order to define a passageway in which a setscrew can be positioned.

Specific means for accomplishing the aim of the invention can best be understood by referring to the drawing in which FIG. 1 shows a cooling fan of the type used to cool the windings of electric motors. This fan is composed of sheet metal which has been deformed to provide two setscrew apertures.

Figure 1:
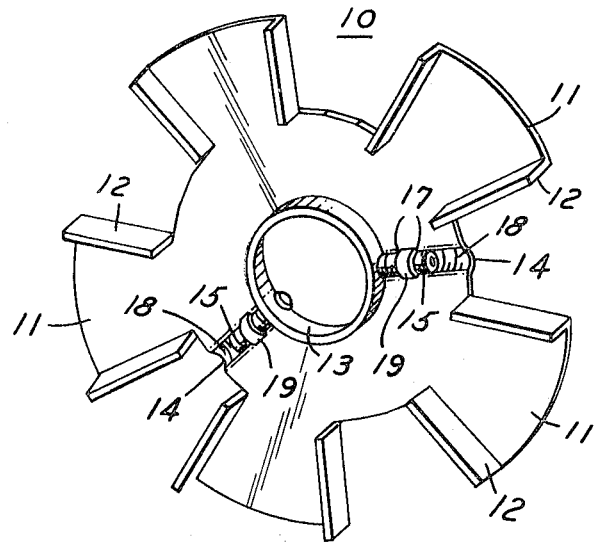
Figure 2:
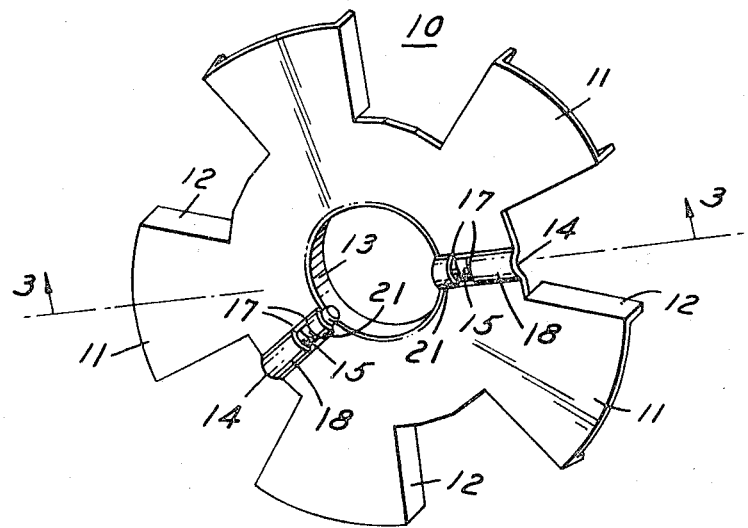
FIG. 2 shows the setscrew apertures from reverse side of the view shown in FIG. 1.
Figure 3:
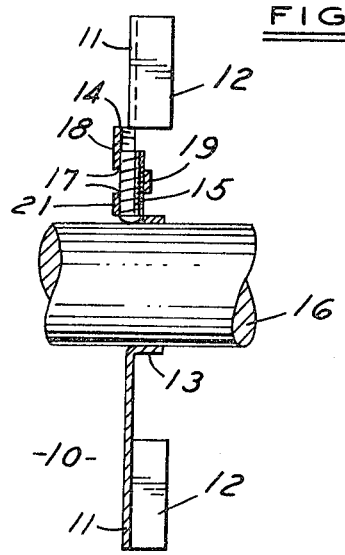
FIG. 3 is a sectional view of a sheet metal fan taken along the line 3—3 of FIG. 2 showing the fan mounted on a shaft.

FIGS. 1 and 2 illustrate a fan 10 composed of sheet metal having a plurality of spokes 11 with turned-up sides 12 constituting the blades of the fan. A turned-up flange 13 at the center of the fan 10 serves to mount the fan on a shaft 16 (FIG. 3).

The sheet metal material of the fan 10 has been deformed in two places to provide setscrew apertures or passageways 14 in accordance with the preferred embodiment of this invention. The apertures 14 are formed by punching a portion of the flange 13 to enable a setscrew 15 to protrude through the flange and engage the shaft 16 on which the fan 10 is mounted. The aperture or passageway 14 is formed by stamping a pair of lancings 17 after which the material is crimped to provide three crimps 18, 19 and 21. The crimps 18 and 21 are oppositely directed with respect to the crimp 19 occupying the center position. In this way the crimps 18, 19 and 21 define an aperture for insertion of the setscrew 15. This aperture is threaded as illustrated. Threading may be accomplished in a separate step or in a step taking place at the same time as the crimping operation by use of a roll tap to effect both crimping and threading.

The crimp 18 is desirably formed with a diameter slightly greater than the setscrew 15 which it is to accommodate. This enables the crimp 18 to serve primarily as a guide thus speeding up and simplifying the insertion of the setscrew 15.

Figure 4:
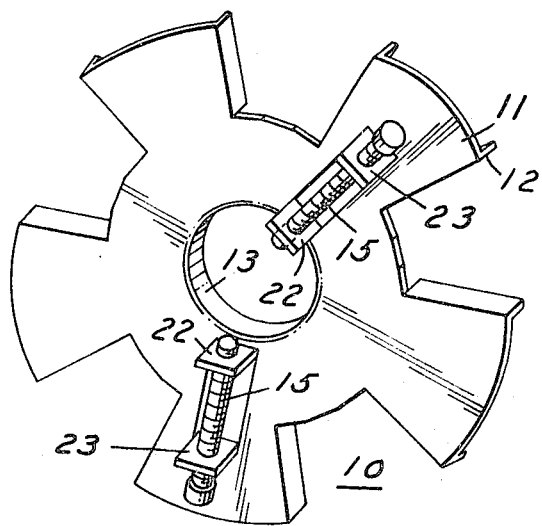
FIG. 4 shows an alternative embodiment of the invention wherein each setscrew passageway is formed from two tabs which have been punched from the fan material.

In the embodiment illustrated in FIG. 4, the setscrew aperture is provided by a pair of aperture tabs 22 and 23 which are produced by punching and lancing the sheet metal of the fan 10 and then bending the tabs defined by the lancing operation in the same direction. The apertures defined by the punching operation may be tapped to provide threads or the setscrew 15 may be a self-tapping screw which will thread the apertures upon insertion.

It is necessary that setscrews provide firm engagement with their associated shafts and that they resist loosening over a long period of time. The sheet metal walls of the setscrew apertures of this invention are much thinner than the aperture walls of conventional bored and tapped setscrew apertures. While such thin wall apertures would appear to be disadvantageous, I have found that they provide design features which are definitely advantageous. For instance, thin sheet metal walls are more resilient than thick walls. Consequently, the crimps 19 and 21 of FIGS. 1 and 2 may be made slightly undersize so that they are placed in hoop tension by insertion of a setscrew. The screw is then locked firmly in place and shows very little disposition to loosen thereafter. In the case of the embodiment of FIG. 4 the setscrew 15 may be inserted in such a way as to leave the tabs 22 and 23 under slight spring tension. This tension tends to lock the screw in position against the shaft 16. In conventional setscrews it is the slight deformation of the engaged screw and aperture threads upon tightening which maintains the screw in set position. This action is also present in the case of the sheet metal aperture of this invention.

A fan of the type illustrated in FIG. 1 was unbalanced by the addition of a 71.7 gram weight to one of the blades. After running for 1 year on a cycle of 4 minutes running and 1 minute off the setscrews still held the fan firmly positioned on the shaft.

While this invention has been described with reference to two specific embodiments, it is obvious that there may be additional constructions of sheet metal setscrew apertures which fall within the proper scope of this invention. Accordingly, it is intended that this invention be limited in scope only as may be necessitated by the scope of the appended claims.

What I claim as new and desire to secure by Letters Patent of the United States is:

1. A method of forming a sheet material fan for assembly with a rotatable dynamoelectric machine shaft, the fan including a sheet material body having a shaft accommodating opening therein, a generally planar section and at least two spaced-apart members arranged to accommodate a fastener and to be held in tension thereby while the fastener bears against a shaft disposed in the shaft accommodating opening; said method comprising forming at least two spaced-apart sheet material securing means in the body of the fan and establishing aperture means for receiving and holding a fastener in firm engagement with a shaft disposed in the shaft accommodating opening of the fan, whereby the fan may be firmly fixed on the shaft for rotation therewith during operation of the dynamoelectric machine forming at least two spaced-apart sheet material securing means in the body of the fan includes severing a segment of the sheet material body along the generally planar section and deforming at least two parts of the generally planar section adjacent to the severed segment of the sheet material body away from the sheet material body.

2. The method of claim 1 wherein forming at least two spaced-apart sheet material securing means in the body of the fan further includes threading the parts of the generally planar section adjacent to the severed segment of the sheet material body.

3. The method of claim 1 further including the step of tapping the parts of the generally planar section adjacent to the severed segment of the sheet material body.

* * * * *